United States Patent [19]

Struhl

[11] Patent Number: 5,275,438
[45] Date of Patent: Jan. 4, 1994

[54] FILE FOLDER WITH ATTACHED COMPUTER DISC POCKET

[75] Inventor: Warren Struhl, Lyndhurst, N.J.
[73] Assignee: Paperdirect, Inc., Lyndhurst, N.J.
[21] Appl. No.: 1,175
[22] Filed: Jan. 7, 1993
[51] Int. Cl.[5] ............................................. B42D 3/00
[52] U.S. Cl. ....................................... 281/31; 281/29; 281/36; 402/70
[58] Field of Search .................... 281/29, 31, 36, 37; 402/70, 73, 74; 206/232

[56] References Cited

U.S. PATENT DOCUMENTS

| | | | |
|---|---|---|---|
| 3,464,135 | 9/1969 | Eidinger | 206/232 X |
| 4,290,524 | 9/1981 | Azar | 281/31 X |
| 4,549,658 | 10/1985 | Sfikas | 281/31 X |
| 4,614,450 | 9/1986 | Neiman | 281/31 X |
| 4,629,349 | 12/1986 | Pitts | 281/31 X |
| 4,793,477 | 12/1988 | Manning | 281/31 X |
| 5,147,036 | 9/1992 | Jacobs | 206/232 |

Primary Examiner—Mark Rosenbaum
Assistant Examiner—Willmon Fridie, Jr.
Attorney, Agent, or Firm—Malina & Wolson

[57] ABSTRACT

An article is provided for the filing and storage together of a computer disc with related paper sheets. The article includes a folder for the sheets and a storage pocket for the computer disc. The storage pocket will be of smaller dimension than the folder and attached to a front surface of the folder. The pocket will have a rear wall, front wall and cover flap, the latter preferably being formed unitarily with the rear wall. A plastic strip attached across an open mouth of the pocket serves as a latching device for retaining the flap in a covering position over the mouth. Preferably the entire article will be of a transparent plastic so as to allow viewing of any contents within either the folder or pocket.

9 Claims, 4 Drawing Sheets

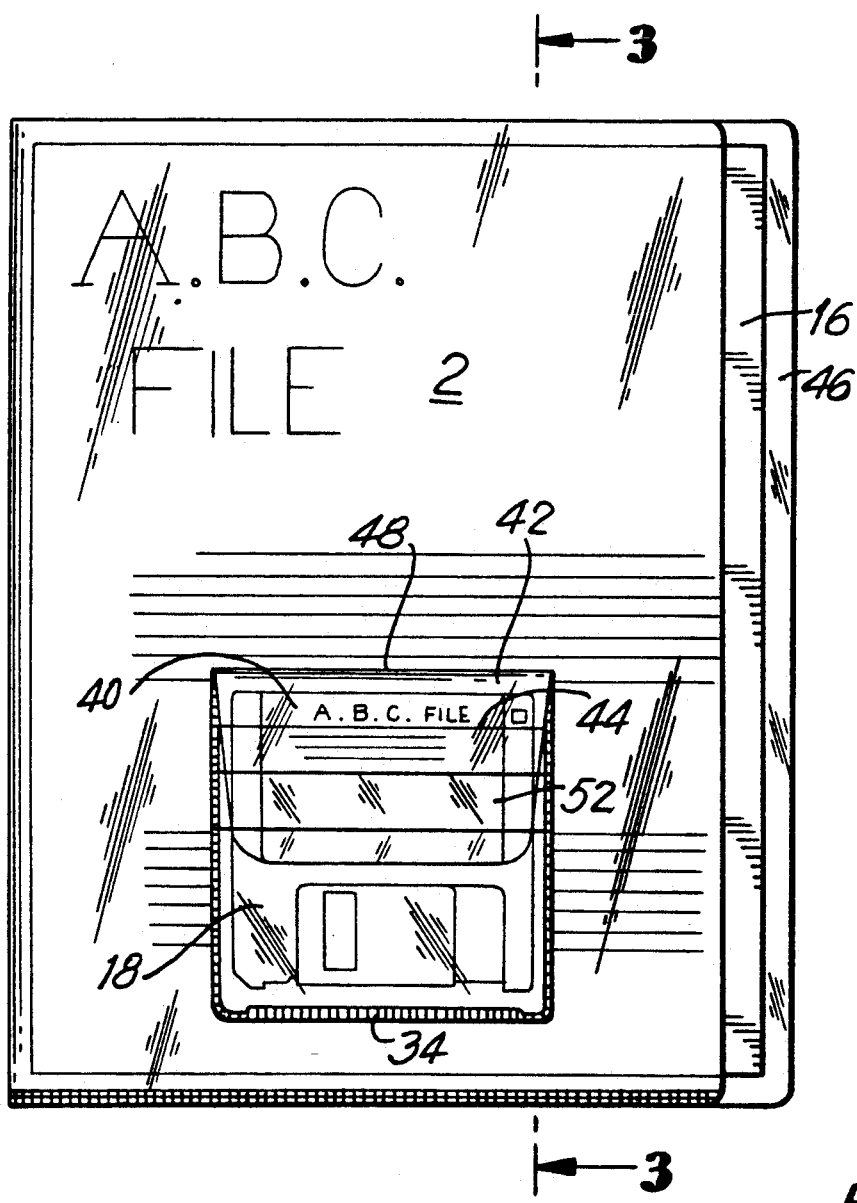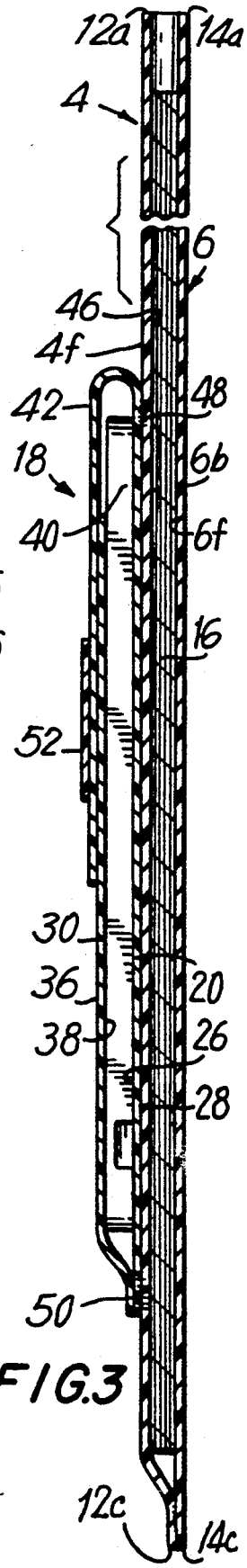

FILE FOLDER WITH ATTACHED COMPUTER DISC POCKET

BACKGROUND OF THE INVENTION

1. Field of the Invention

The invention concerns a file folder with a transparent computer disc pocket.

2. The Related Art

New needs have arisen in every aspect of office equipment with the advent of the computer age. Maintenance of records has also been revolutionized. In the early days of the computer age, records were stored on large central memory bank tapes of a mainframe machine. Nowadays the office is usually outfitted with a series of personal computers. Each of these has its own document storage device. Common with such devices are the so-called floppy disc. These discs come in sizes of about 30 and 12 square inches.

Floppy discs have become quite inexpensive. As a consequence, businesses often dedicate a single disc to a particular work unit. For instance, patent attorneys are known to assign separate discs to each of their cases. A problem has therefore arisen with regard to filing and storing of the disc. Many businesses prefer to store the disc in a common folder with related paper correspondence or even with paper printout of the electronically stored data. A patent attorney as in the aforementioned example would store a disc of the specification and/or amendments within the file wrapper alongside the usual hard paper copies.

Comingling of electronic data with paper copy is often haphazard. Better organization is needed within the files. Rapid retrieval of the electronic data device is not often possible. The disc may be hidden among a forest of paper reports. Haphazard insertion of the disc among the hard copy may also result in damage to the electronic data. Breakage or bending is one such danger. A more significant danger is, however, unwanted finger contact on vital areas of the disc which may arise during rummaging through a file. Dust and other contaminants is a still further difficulty faced by unprotected electronic data devices.

Accordingly, it is an object of the present invention to provide a combined storage system for computer discs and corresponding paper copy.

It is a further object of the present invention to provide a storage system that maintains the computer disc and related paper copy together, yet permits the disc to occupy a separate protected area or compartment.

A still further object of the present invention is to provide a storage system that combines a computer disc with related paper copy in a manner which allows immediate visibility of the disc and facile reading of its subject title.

Still another object of the present invention is to provide a storage system for combined computer disc and related paper copy which is relatively inexpensive to manufacture.

SUMMARY OF THE INVENTION

An article for combined storage of computer discs and paper copy is provided which comprises:

a folder having a first and a second panel each with a front and back surface, the back of the first panel and front of the second panel being juxtaposed against one another, each of the panels bordered by a plurality of edges and connected along at least one edge, the panels being separable so as to hold therebetween at least one sheet of paper; and a storage pocket of smaller dimensions than the folder attached to the front surface of the first panel comprising:

a rear wall whose margins include a pair of parallel side edges joined by a transverse edge along a bottom of the rear wall, the rear wall having a front and rear face;

a front wall whose margins include a pair of parallel side edges joined by a transverse edge along a bottom of the front wall, the front wall having a front and rear face, the front and rear walls being juxtaposed against one another and joined along each of the respective side and transverse edges thereby forming a pocket for holding a computer disc; and a cover flap hingedly connected along an open mouth of the pocket which is parallel to the transverse edges, the flap capable of covering the open mouth to prevent egress of the computer disc when present in the pocket, the flap and the front wall being transparent.

The preferred form of the folder is generally rectangular with dimensions of width and length that are at least eight (8") inches by eleven (11") inches. Larger size panels will be necessary when containing legal-size and A4 paper. A tab area may be provided on the folder in an area on the back of the second panel. This area is formed by the second panel being a smaller dimension than the first panel.

The rear wall, front wall and cover flap of the pocket is advantageously formed of a transparent plastic. Among suitable plastics are polyvinyl chloride, polyvinyl acetate, polyethylene and polypropylene. Most preferred, however, is polyvinyl chloride. Dimensions of the pocket are preferably square. A particularly low cost arrangement is where the cover flap and rear wall are of a unitary construction. Another cost effective feature is where the pocket is attached to the front surface of the first panel via a heat seal across the rear wall above an area defining the open mouth of the pocket. A further heat seal may be positioned along the transverse edge of the front surface of the first panel. In this arrangement the storage pocket will have no walls in common with the folder. A preferred arrangement of the pocket on the folder is for the bottom edge of the pocket to be parallel to the edge of the folder that connects the first and second panel components.

A latching device is advantageously provided on the front wall of the pocket. This device is intended for retaining the cover flap in a position that will maintain the cover flap over the open mouth of the pocket. The preferred latching device is a strip of plastic stretched between the parallel edges of the front wall on the storage pocket. The heat seal holding the pocket to the folder may serve the further function as a hinge along which the cover flap can be bent so as to close the mouth of the pocket.

The article of this invention may also be provided with a plurality of holes through the folder panels to allow insertion into a loose-leaf binder. Thus, there may be a set of aligned holes punched the first and second panels adjacent an edge of the folder. These sets of holes along each of the panels will be spaced equally distantly from one another.

BRIEF DESCRIPTION OF THE DRAWING

The above features, advantages and object of the present invention will more fully be appreciated through consideration of the following drawing in which:

FIG. 2 is front plan view of the article, now containing the computer disc and paper copy within the pocket and folder, respectively;

FIG. 3 is a cross-sectional view along line 3—3 shown in FIG. 2;

DETAILED DESCRIPTION

Figure 1:
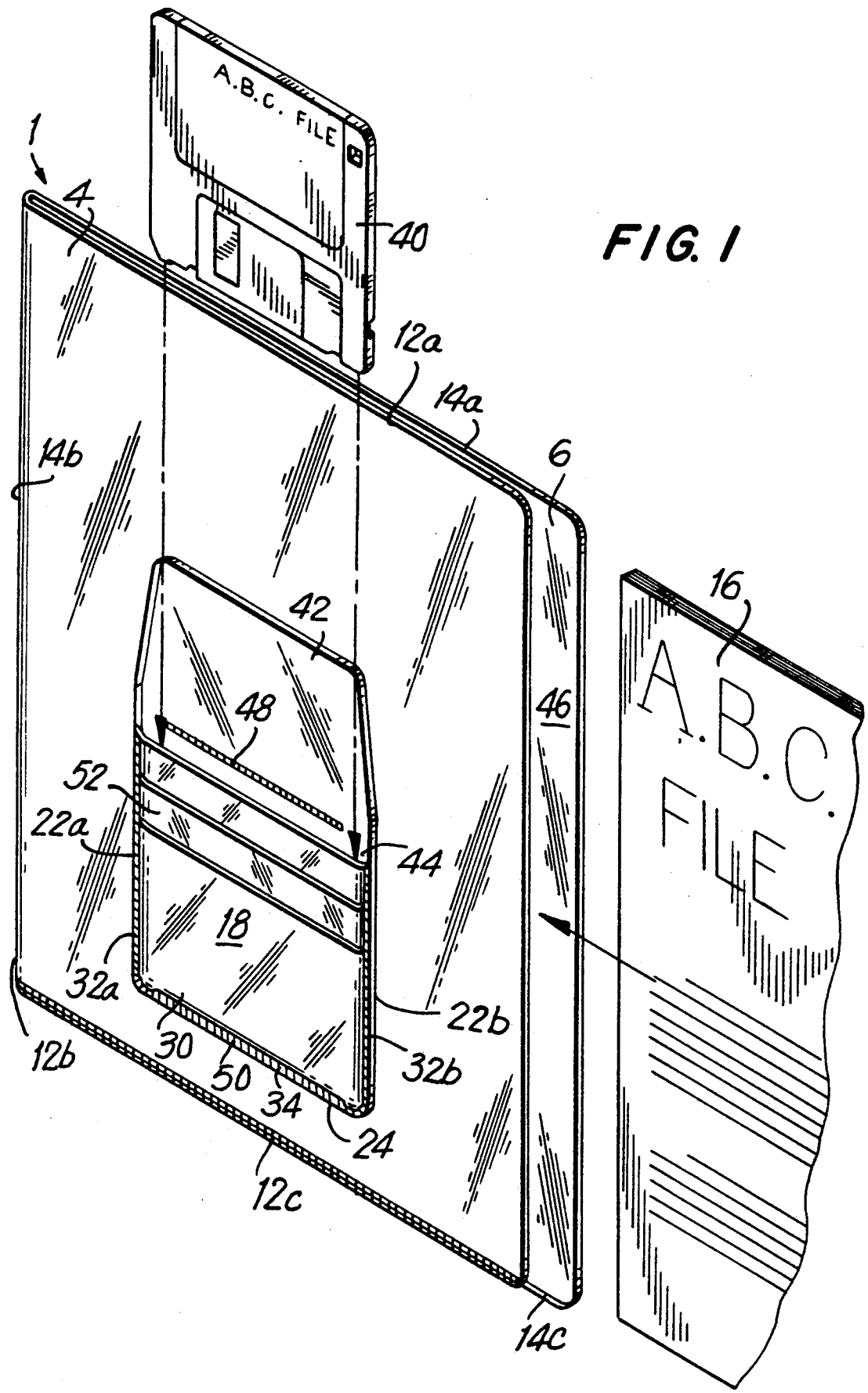
FIG. 1 is a perspective plan view of the article illustrating proposed placement of computer disc and paper copy.

According to the present invention there is provided an article 1 for the combined storage of a computer disc and hard copy paper sheets. FIGS. 1-3 illustrate the article as including a folder 2 having a first and second panel 4,6 each with a respective front surface 4f,6f and back surface 4b,6b. The back surface 4b of the first panel 4 and the front surface 6f of the second panel 6 are juxtaposed against one another. Each of these panels are bordered by a plurality of edges 12a,b,c and 14a,b,c and connected along at least one edge 12c,14c. Panels 4 and 6 are separable so as to hold at least one sheet 16 of paper therebetween.

Besides the folder, the article also includes a storage pocket 18 of smaller dimensions than the folder 2. Storage pocket 18 is attached to the front surface 4f of the first panel 4. Storage pocket 18 includes a rear wall 20, a front wall 30 and a cover flap 42.

The rear wall 20 has margins that include a pair of parallel side edges 22a,b joined by a transverse edge 24 along a bottom of the rear wall 20. The rear wall has a front face 26 and rear face 28.

Front wall 30 has margins that include a pair of parallel sides 32a,b joined by a transverse edge 34 along a bottom of the front wall. The front wall 30 is formed from a front face 36 and a rear face 38. Rear and front walls 20,30 are adjacent one another and adjoined along each of the respective side and transverse edges 22a,b and 24 thereby forming the pocket.

Cover flap 42 is hingedly connected along an open mouth 44 of the pocket 18. Cover flap 42 is capable of covering the open mouth 44 of the pocket to prevent egress of the computer disc 40 when the latter is present in the pocket. Advantageously, flap 42 and front wall 30 are transparent to thereby allow reading of any file marking on the computer disc.

Panels 4,6 of the folder 2 are preferably rectangular with dimensions of width and length being at least eight (8") inches by eleven (11") inches. A tab area 46 is provided on folder 2 along an area of the front surface 6f of the second panel 6. Tab area 46 is fashioned by the second panel being of smaller dimension than the first panel 4. Preferably the rear wall 20, front wall 30 and cover flap 42 comprising pocket 18 are all formed from a transparent flexible plastic. Since most computer discs are of square dimension, pocket 18 will also preferably be of square dimension. For the purpose of economical manufacture, cover flap 42 and rear wall 20 are desirably of a unitary construction. Furthermore, storage pocket 18 is best manufactured as an item separate from folder 2 and therefore will have no walls in common with folder 2. In this instance, pocket 18 is pre-formed and then attached to the front surface 4f of the first panel 4 via a heat seal 48 above and parallel to open mouth 44. A further heat seal 50 is provided along transverse edge 34. The bottom of the pocket defined by transverse edge 34 desirably is parallel to edge 12c connecting the first and second panels, 4 and 6 respectively.

A latching device in the form of a strip or a band 52 is provided on the front face 36 of the front wall 30 of pocket 18. The strip 52 functions by retaining flap 42 underneath in a position that will maintain the flap so that it covers the open mouth 44. Strip 52 bridges between parallel edges 32a,b of the front wall 30. Advantageously, strip 52 will be formed of a transparent plastic in common with the plastic forming other parts of the pocket. Heat seal 48 can serve the further function as a hinge for allowing flap 42 to bend when covering open mouth 44 of the pocket 18.

Figure 4:
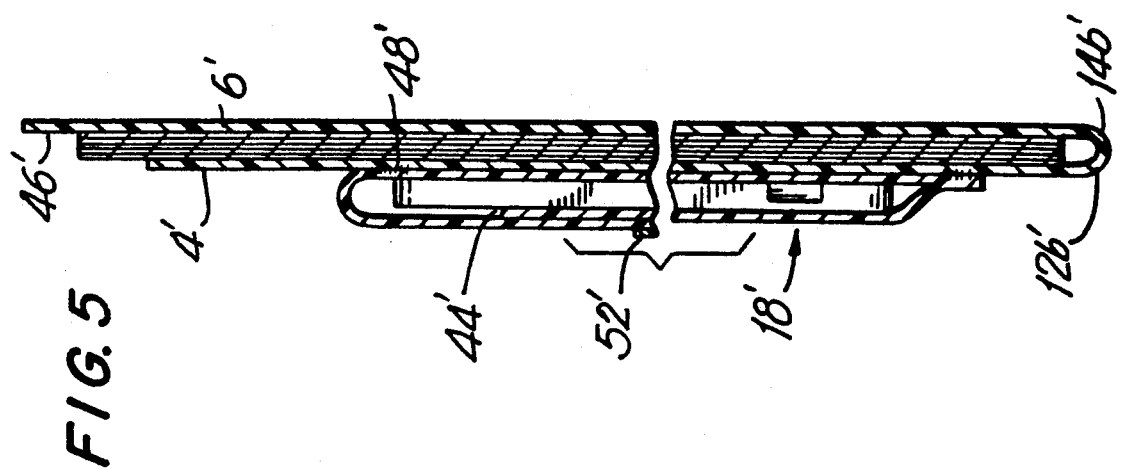
FIG. 4 is a front plan view of a second embodiment according to the present invention.
Figure 5:
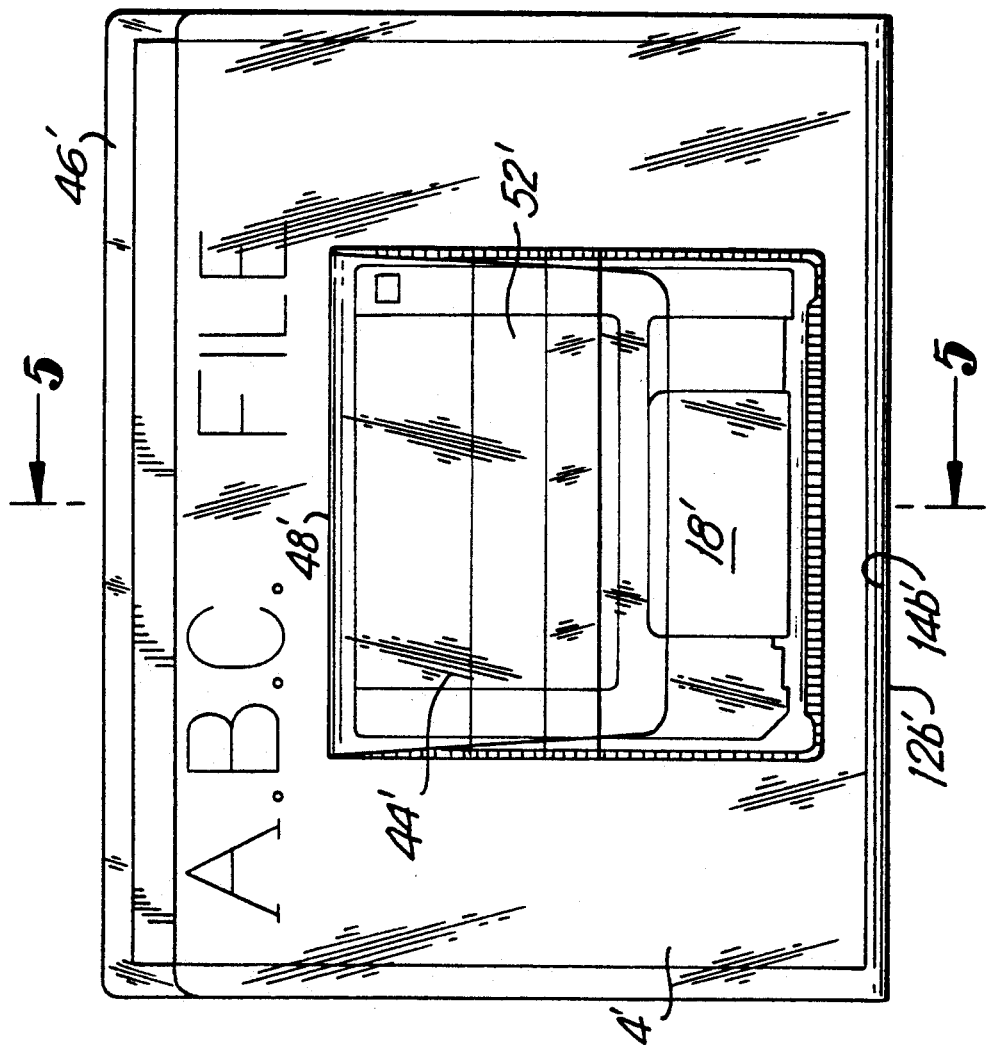
FIG. 5 is a cross-sectional view along line 5—5 of the second embodiment shown in FIG. 4.

FIG. 4 and 5 illustrate a second embodiment of the invention, components of which are marked with primed numerals equivalent to those utilized for describing the first embodiment. In this second embodiment, a pocket 18' having an open mouth 44', latching strip 52' and heat seal 48' are all parallel to tab area 46'. A further distinguishing feature of the second embodiment is that only a single edge, i.e. edge 12b' and 14b' of the first and second panels 4' and 6' are joined. This joinder of edges is most simply achieved by folding in approximately half a single sheet of transparent flexible plastic.

Figure 6:
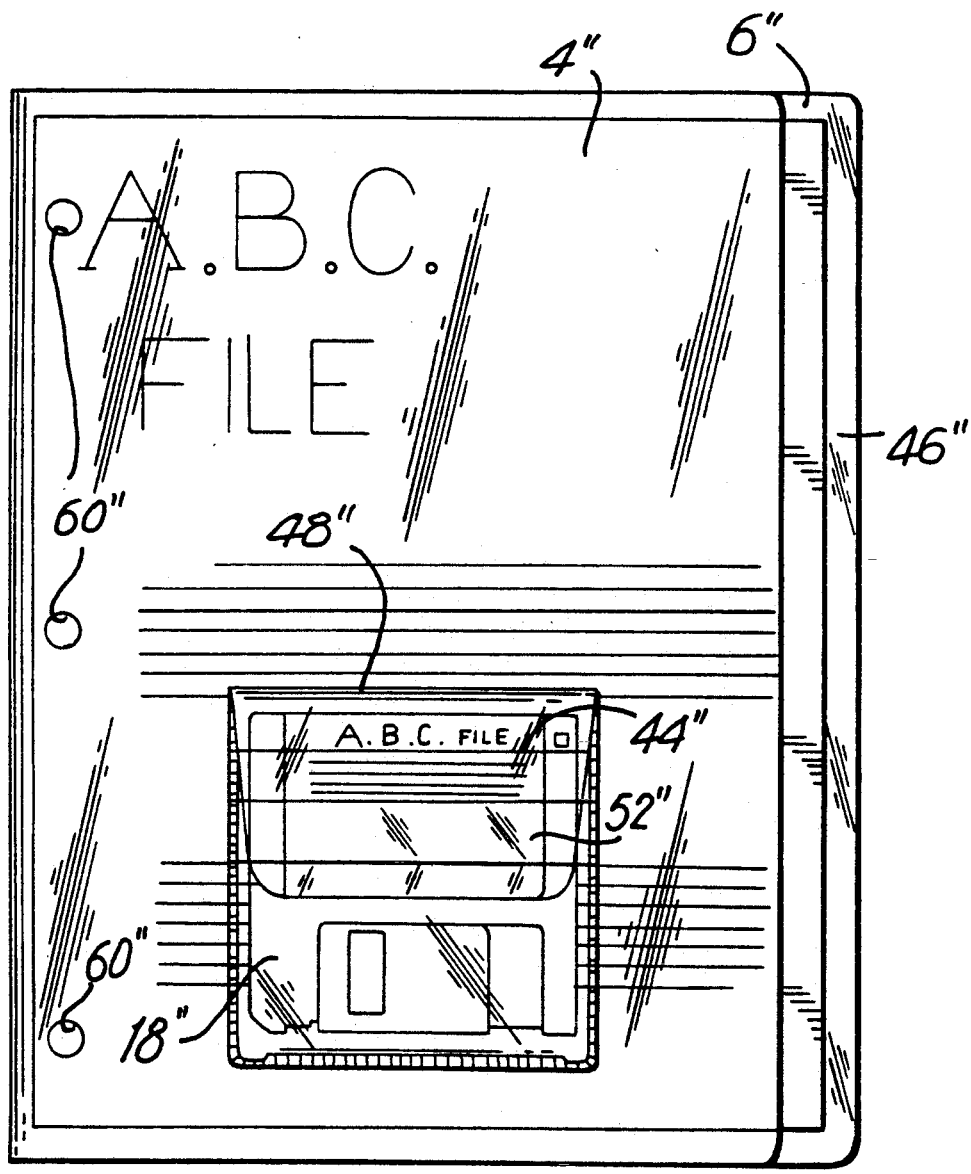
FIG. 6 is a front plan view of the article similar to FIG. 2, except illustrating a set of punch-holes along a left border.

FIG. 6 illustrates a further advantageous feature of the present invention. In the FIG. 6 each of the elements are marked with double primed numerals equivalent to those utilized for describing elements of FIGS. 1-3. Thus, there is illustrated a pocket 18" having an open mouth 44" latching strip 52" and heat seal 48" which are all parallel to tab area 46". A series of three holes 60" are formed on the first panel 4". An identical set of holes are punched through the second panel 6" in an aligned arrangement with the wholes of the first panel. Each set of holes are equally distantly spaced from one another and the standard spacing for allowing their incorporation into a standard loose-leaf binder.

The foregoing description and FIGS. are selected embodiments of the present invention. In light thereof various modifications will be suggested to those skilled in the art, all of which are within the purview and spirit of this invention.

What is claimed is:

1. An article for combined storage of a computer disc and paper copy comprising:
   a folder having a first and a second panel each with a front and back surface, said back surface of said first panel and front surface of aid second panel being juxtaposed against one another, each of said panels being bordered by a plurality of edges and connected along at least one edge, said panels being separable so as to hold at least one sheet of paper therebetween;
   a storage pocket of smaller dimensions than said folder attached to said front surface of aid first panel comprising:

a rear wall whose margins include a pair of parallel side edges joined by a transverse edge along a bottom of said rear wall, said rear wall having a front and rear face;

a front wall whose margins include a pair of parallel side edges joined by a transverse edge along a bottom of said front wall, said front wall having a front and rear face, said front and rear walls being juxtaposed against one another and joined along each of the respective side and transverse edges thereby forming a pocket for holding a computer disc; and a cover flap hingedly connected along an open mouth of said pocket which is parallel to said transverse edges, said cover flap capable of covering said open mouth to prevent egress of said computer disc when present in said pocket, said cover flap and said front wall being transparent, said cover flap and said rear wall being of a unitary construction, said storage pocket being attached to said front surface of said first panel via a heat seal above an area bordering said open mouth and a further heat seal along said transverse edge, and said heat seal serving as a hinge for bending said cover flap over said open mouth of said storage pocket.

2. The article according to claim 1 wherein said first and second panels are rectangular with dimensions of width and length being at least 8"×11".

3. The article according to claim 1 further comprising a tab area on said folder along an area of said front of the second panel and formed by said second panel being of larger dimension than said first panel.

4. The article according to claim 1 wherein said pocket is approximately of square dimension.

5. The article according to claim 1 wherein said storage pocket has no walls in common with said folder.

6. The article according to claim 1 wherein said bottom transverse edge of said storage pocket is parallel to said transverse edge connecting said first and second panels.

7. The article according to claim 1 further comprising a latching means on said front face of said front wall of said storage pocket for retaining said cover flap in a position that will maintain said cover flap covering said open mouth.

8. The article according to claim 7 wherein said latching means is a strip bridging between said parallel edges of said front wall.

9. The article according to claim 1 further comprising a plurality of holes formed in said first panel which are aligned with an equivalent number of holes in the said second panel, said holes allowing said article to be bound in a loose-leaf binder.

* * * * *